US012788149B2

(12) United States Patent
Fukami et al.

(10) Patent No.: US 12,788,149 B2
(45) Date of Patent: Nov. 10, 2026

(54) CUSHION SPRING

(71) Applicant: TOYOTA BOSHOKU KABUSHIKI KAISHA, Aichi-ken (JP)

(72) Inventors: Jun Fukami, Aichi-ken (JP); Yoshiomi Nishigaki, Aichi-ken (JP); Kouji Akao, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 141 days.

(21) Appl. No.: 18/766,975

(22) Filed: Jul. 9, 2024

(65) Prior Publication Data

US 2025/0017381 A1 Jan. 16, 2025

(30) Foreign Application Priority Data

Jul. 12, 2023 (JP) ................................ 2023-114316

(51) Int. Cl.
*A47C 7/30* (2006.01)
*B60N 2/70* (2006.01)

(52) U.S. Cl.
CPC .............. *A47C 7/30* (2013.01); *B60N 2/7094* (2013.01)

(58) Field of Classification Search
CPC .......... A47C 7/30; B60N 2/7094; B60N 2/68; B60N 2/72; B60N 2/54; B60N 2/62
USPC .................................... 297/452.52, 142, 112
See application file for complete search history.

(56) References Cited

U.S. PATENT DOCUMENTS

| | | | | |
|---|---|---|---|---|
| 5,908,220 A * | 6/1999 | Bauer | B60N 2/62 | 297/313 |
| 6,412,874 B1 * | 7/2002 | Mayer | B60N 2/7094 | 297/452.52 |
| 7,137,669 B2 * | 11/2006 | Nagayama | F16F 1/26 | 297/452.52 |

(Continued)

FOREIGN PATENT DOCUMENTS

| | | |
|---|---|---|
| DE | 102017116821 | 2/2018 |
| JP | 2018-161912 | 10/2018 |
| JP | 2019-73115 | 5/2019 |

OTHER PUBLICATIONS

Office Action issued in Corresponding DE Patent Application No. 102024118965.7, dated Nov. 25, 2025, along with an English translation thereof.

(Continued)

*Primary Examiner* — Maria E Graber
(74) *Attorney, Agent, or Firm* — Greenblum & Bernstein, P.L.C.

(57) ABSTRACT

There is provided a cushion spring including: a pair of formed wires bridged to a seat cushion frame in a seat front-rear direction and are arranged side by side in a seat width direction; and a resin member joined to the pair of formed wires. The resin member includes a rear connecting portion and a pair of deflection restricting portions, the rear connecting portion extending to connect between a side wire and a center wire and between the center wires in the seat width direction in a region on a seat rear side of an ischium supporting portion of the pair of formed wires that supports an ischium of the seated occupant via a seat cushion pad, the pair of deflection restricting portions extending from the rear connecting portion to connect all crank-shaped portions in the seat front-rear direction.

7 Claims, 12 Drawing Sheets

(56) References Cited

U.S. PATENT DOCUMENTS

| | | | | |
|---|---|---|---|---|
| 8,662,483 | B2 * | 3/2014 | Yamaguchi | B60N 2/0032 267/144 |
| 9,630,527 | B2 * | 4/2017 | Matsui | B60N 2/165 |
| 9,796,310 | B1 | 10/2017 | Line et al. | |
| 9,950,650 | B1 * | 4/2018 | Watanabe | B60N 2/01583 |
| 10,363,849 | B2 * | 7/2019 | Takahashi | B60N 2/7094 |
| 10,434,911 | B2 * | 10/2019 | Higashihara | B60N 2/7011 |
| 10,538,212 | B2 * | 1/2020 | Onuma | B60R 16/037 |
| 2015/0306998 | A1 * | 10/2015 | Matsui | B60N 2/7058 297/452.52 |
| 2018/0118068 | A1 | 5/2018 | Onuma et al. | |
| 2018/0272908 | A1 | 9/2018 | Onuma et al. | |
| 2018/0272969 | A1 | 9/2018 | Onuma | |
| 2020/0148145 | A1 | 5/2020 | Onuma | |
| 2021/0061203 | A1 | 3/2021 | Onuma | |
| 2022/0118923 | A1 | 4/2022 | Onuma | |
| 2023/0356678 | A1 | 11/2023 | Onuma | |

OTHER PUBLICATIONS

Office Action issued in Corresponding JP Patent Application No. 2023-114316, dated Sep. 8, 2026, along with an English thereof.

* cited by examiner

CUSHION SPRING

CROSS-REFERENCE TO RELATED APPLICATIONS

This application is based on and claims priority under 35 USC 119 from Japanese Patent Application No. 2023-114316 filed on Jul. 12, 2023, the contents of which are incorporated herein by reference.

TECHNICAL FIELD

The present disclosure relates to a cushion spring. Specifically, the disclosure relates to a cushion spring that is bridged to a seat cushion frame in a seat front-rear direction and receives a load of a seated occupant by a surface thereof.

BACKGROUND ART

JP2019-073115A discloses a cushion spring that is bridged to a seat cushion frame forming a framework of a seat cushion and receives a load of a seated occupant by a surface thereof. The cushion spring includes a pair of left and right formed wires bridged between a frame front portion and a frame rear portion of the seat cushion frame. Each formed wire is folded in a U-shape in a plan view. A center wire and a side wire of each formed wire that are folded are bridged between the frame front portion and frame rear portion of the seat cushion frame so as to extend in a front-rear direction.

In the configuration disclosed in JP2019-073115A, the center wire and the side wire are symmetrical to each other. Therefore, when increasing the roll rigidity of a side portion of the seat cushion, it is necessary to partially hardens a side portion of a cushion pad. However, in a configuration in which the hardness of the cushion pad is partially changed, elasticity weakening, a variation in position, and a variation in hardness are likely to occur in the pad, and the roll rigidity cannot be stably increased. Therefore, the present disclosure provides a cushion spring capable of appropriately increasing roll rigidity of a side portion of a seat cushion.

SUMMARY OF INVENTION

To solve the above problems, a cushion spring according to the present disclosure is configured as follows.

According to a first aspect of the present disclosure, a cushion spring configured to receive a load of a seated occupant by a surface of the cushion spring includes: a pair of formed wires configured to be bridged to a seat cushion frame in a seat front-rear direction and are arranged side by side in a seat width direction; and a resin member that is joined to the pair of formed wires. The pair of formed wires each have a center wire and a side wire that are arranged side by side in the seat width direction and extending in the seat front-rear direction. The center wire and the side wire are arranged in an order from a center of the seat cushion frame to an outer side in the seat width direction. The resin member includes a rear connecting portion and a pair of deflection restricting portions, the rear connecting portion extending to connect between the side wire and the center wire and between the center wires in the seat width direction in a region on a seat rear side of an ischium supporting portion of the pair of formed wires that supports an ischium of the seated occupant via a seat cushion pad, the pair of deflection restricting portions extending from the rear connecting portion in the seat front-rear direction to connect all crank-shaped portions that are formed in the side wires and bent to repeatedly folding in the seat width direction.

According to the first aspect, when a load of the seated occupant is applied to one of the formed wires, the load is also transmitted to the other of the formed wires by the rear connecting portion of the resin member. As a result, the formed wires are less likely to sink downward and can receive the load stably. Further, each deflection restricting portion of the resin member can effectively restrict the deflection of the crank-shaped portions formed in the side wires. Accordingly, each side wire is less likely to sink downward when a load of a seated occupant is received by a surface thereof. As a result, roll rigidity of a side portion of a seat cushion is appropriately increased.

According to a second aspect of the present disclosure, in the first aspect, the pair of deflection restricting portions planarly support the seat cushion pad from a pad back side at an angle of facing obliquely inward at a position higher than the side wire connected by the pair of deflection restricting portions.

According to the second aspect of the disclosure, the thighs of the seated occupant can be widely and planarly supported from oblique outer sides by the pair of deflection restricting portions. The pair of deflection restricting portions extend to a position where the deflection restricting portions are connected to the rear connecting portion located on the seat rear side of the ischium supporting portion. Accordingly, the pair of deflection restricting portions can also support the bases (the greater trochanters and the lesser trochanters) of the thighs from the oblique outer sides. As a result, wobbling of a posture of the seated occupant in a roll direction can be appropriately restricted.

According to a third aspect of the present disclosure, in the first or second aspect, the pair of deflection restricting portions connect all the crank-shaped portions formed in each side wire in the seat front-rear direction over an entire region in the seat width direction.

According to the third aspect of the present disclosure, it is possible to more effectively restrict the side wires from sinking downward. As a result, the roll rigidity of the side portion of the seat cushion can be more appropriately increased. Further, even when the seated occupant has a relatively small body size, the thighs of the seated occupant can be appropriately supported from the pad back side by the pair of deflection restricting portions.

According to a fourth aspect of the present disclosure, in the first or second aspect, the pair of deflection restricting portions include an external projecting portion that projects outward beyond a most external projecting portion of each side wire in the seat width direction and planarly support the seat cushion pad from a pad back side.

According to the fourth aspect of the present disclosure, even when the seated occupant has a relatively large body size, it is possible to appropriately support the thighs of the seated occupant from the pad back side by the external projecting portions projecting from the pair of deflection restricting portions. Each external projecting portion projects from the corresponding deflection restricting portion formed integrally with the corresponding side wire. Accordingly, the external projecting portions are less likely to sink downward and can receive a load stably.

According to a fifth aspect of the present disclosure, in the first or second aspect, an inner edge of the pair of deflection restricting portions in the seat width direction is thinner than an outer edge of the pair of deflection restricting portions.

According to the fifth aspect, the inner edge of the pair of deflection restricting portions is more likely to be deflected than the outer edge. Accordingly, it is possible to smoothen a change in hardness between a portion where the pair of deflection restricting portions are provided and a portion where the pair of deflection restricting portions are not provided. As a result, when the pair of deflection restricting portions are provided, it is also possible to appropriately improve the performance in dispersing the pressure by seating when seated.

According to a sixth aspect of the present disclosure, in the first or second aspect, the rear connecting portion includes a central connecting portion that connects between the center wires and between a pair of side connecting portions each of which connects the side wire and the center wire. The central connecting portion and the pair of side connecting portions planarly support the seat cushion pad from a pad back side at an angle of facing obliquely forward at a position higher than the center wires and the side wires connected by the central connecting portion and the pair of side connecting portions.

According to the sixth aspect of the disclosure, the central connecting portion and the pair of side connecting portions can widely and planarly support the rear hip portion on the rear side of the ischium of the seated occupant obliquely from the rear side. Accordingly, wobbling of the pelvis of the seated occupant in the roll direction can be appropriately restricted. As a result, it is possible to appropriately restrict forward slip due to the wobbling of the hip portion of the seated occupant.

According to a seventh aspect of the present disclosure, in the first or second aspect, the rear connecting portion includes a recessed clamp portion that is recessed from a seat front side toward a seat back side to clamp an object from the seat back side, and a rib that projects in a recess of the clamp portion to form an upper surface flush with the rear connecting portion.

According to the seventh aspect, even when the recessed clamp portion is formed in the rear connecting portion, a support surface for supporting the seat cushion pad from the pad back side can be appropriately secured in the rear connecting portion.

DESCRIPTION OF EMBODIMENTS

Figure 1:
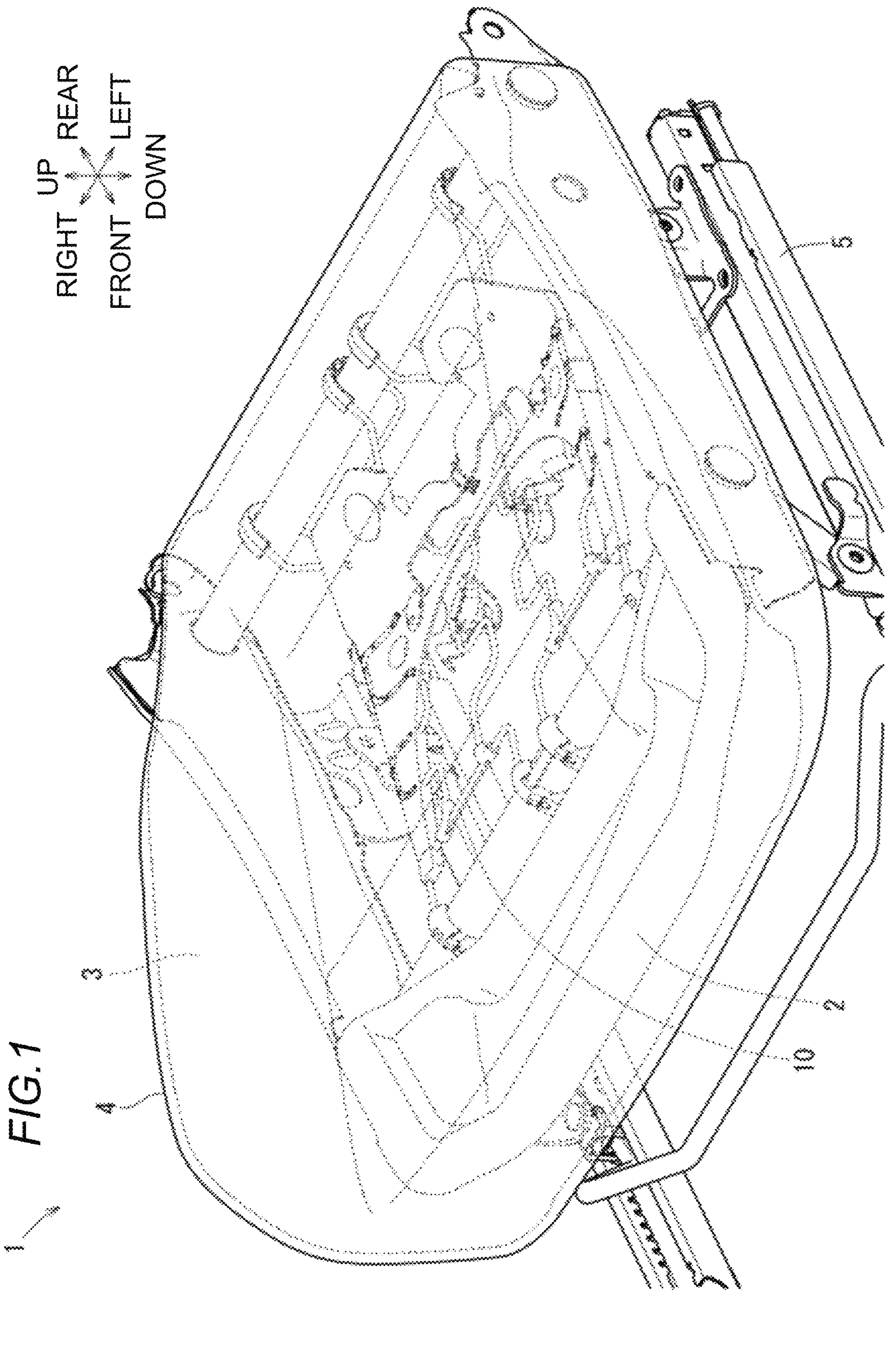
FIG. 1 is a perspective view of illustrating a schematic configuration of a cushion spring according to a first embodiment.

Hereinafter, embodiments of the present disclosure will be described with reference to the drawings.

First Embodiment

Schematic Configuration of Cushion Spring 10

First, a configuration of a cushion spring 10 according to a first embodiment of the present disclosure will be described with reference to FIGS. 1 to 7. In the following description, when a direction such as front, rear, up, down, left, or right is described, it is assumed that the direction indicates a corresponding direction illustrated in the drawings.

When combinations of the directions with a word "seat" are described such as a "seat width direction", the combinations indicate directions based on a seat cushion 1. In addition, in the following description, when a specific reference diagram is not described or when there is no corresponding reference numeral in the reference diagram, any one of FIGS. 1 to 7 is referred to as appropriate.

As illustrated in FIG. 1, the cushion spring 10 according to the present embodiment is applied to the seat cushion 1 of an automobile seat. The automobile seat includes a seatback (not illustrated) serving as a backrest for a seated occupant and the seat cushion 1 serving as a seating portion.

The seat cushion 1 is installed on a floor of an automobile (not illustrated) via slide rails 5. Accordingly, a position of the seat cushion 1 in a seat front-rear direction with respect to the floor can be adjusted via the slide rails 5.

The slide rails 5 are installed on the floor (not illustrated) in a forward rising manner so as to have a rail angle of about one degree. Accordingly, the seat cushion 1 is installed in a manner of pointing upward at substantially one degree with respect to the floor via the slide rails 5. The rail angle of the slide rail 5 rising forward is not limited to 1 degree, and may be 0 degree or 5 degrees. Further, the angle may be other degrees.

The seat cushion 1 includes a seat cushion frame 2 that forms a framework thereof and a seat cushion pad 3 that covers the seat cushion frame 2 from above. The seat cushion 1 further includes a seat cushion cover 4 that covers the seat cushion pad 3 from a pad surface side.

The seat cushion 1 further includes the cushion spring 10 that is bridged to the seat cushion frame 2 in the seat front-rear direction. The cushion spring 10 functions as a pad receiving portion that receives a load of a seated occupant by a surface thereof via the seat cushion pad 3.

Figure 2:
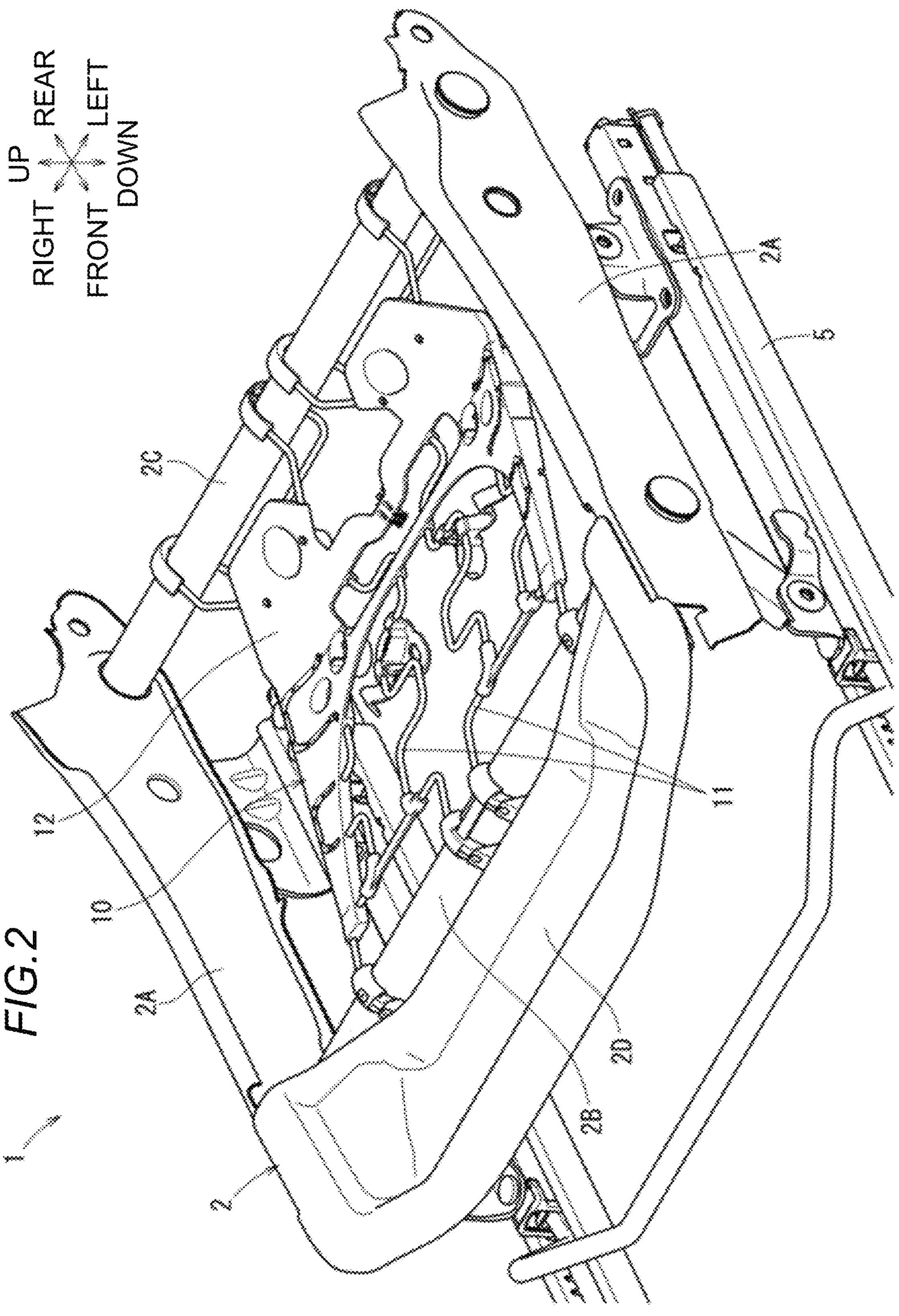
FIG. 2 is a perspective view of illustrating an internal framework of a seat cushion.

As illustrated in FIG. 2, the seat cushion frame 2 is formed of a metal member assembled in a frame shape in a plan view. Specifically, the seat cushion frame 2 includes lower arms 2A that form left and right side frameworks of the seat cushion 1 and a front pipe 2B that is integrally bridged between front portions of the lower arms 2A. The seat cushion frame 2 further includes a rear pipe 2C that is integrally bridged between rear portions of the lower arms 2A and a front panel 2D that is integrally bridged between upper edges of front ends of the lower arms 2A.

Referring to FIG. 1, the seat cushion pad 3 is formed of a polyurethane foamed body. The seat cushion pad 3 is set in a manner of covering the entire upper portion of the seat cushion frame 2 from above the seat. Accordingly, the seat cushion pad 3 is set such that a peripheral portion thereof is firmly supported by the seat cushion frame 2 from below the seat and a central portion thereof is softly supported by the cushion spring 10 from below the seat.

The seat cushion cover 4 is formed of a planar fabric member. The seat cushion cover 4 covers, from the pad surface side, the seat cushion pad 3 set on the upper portion of the seat cushion frame 2. The seat cushion cover 4 is fixed to the seat cushion frame 2 such that front, rear, left, and right ends of the seat cushion cover 4 are pulled below the seat. Accordingly, the seat cushion cover 4 is widely stretched over the pad surface of the seat cushion pad 3, and holds the seat cushion pad 3 in a state of being pressed against the upper portion of the seat cushion frame 2 and fixed in position.

Figure 3:
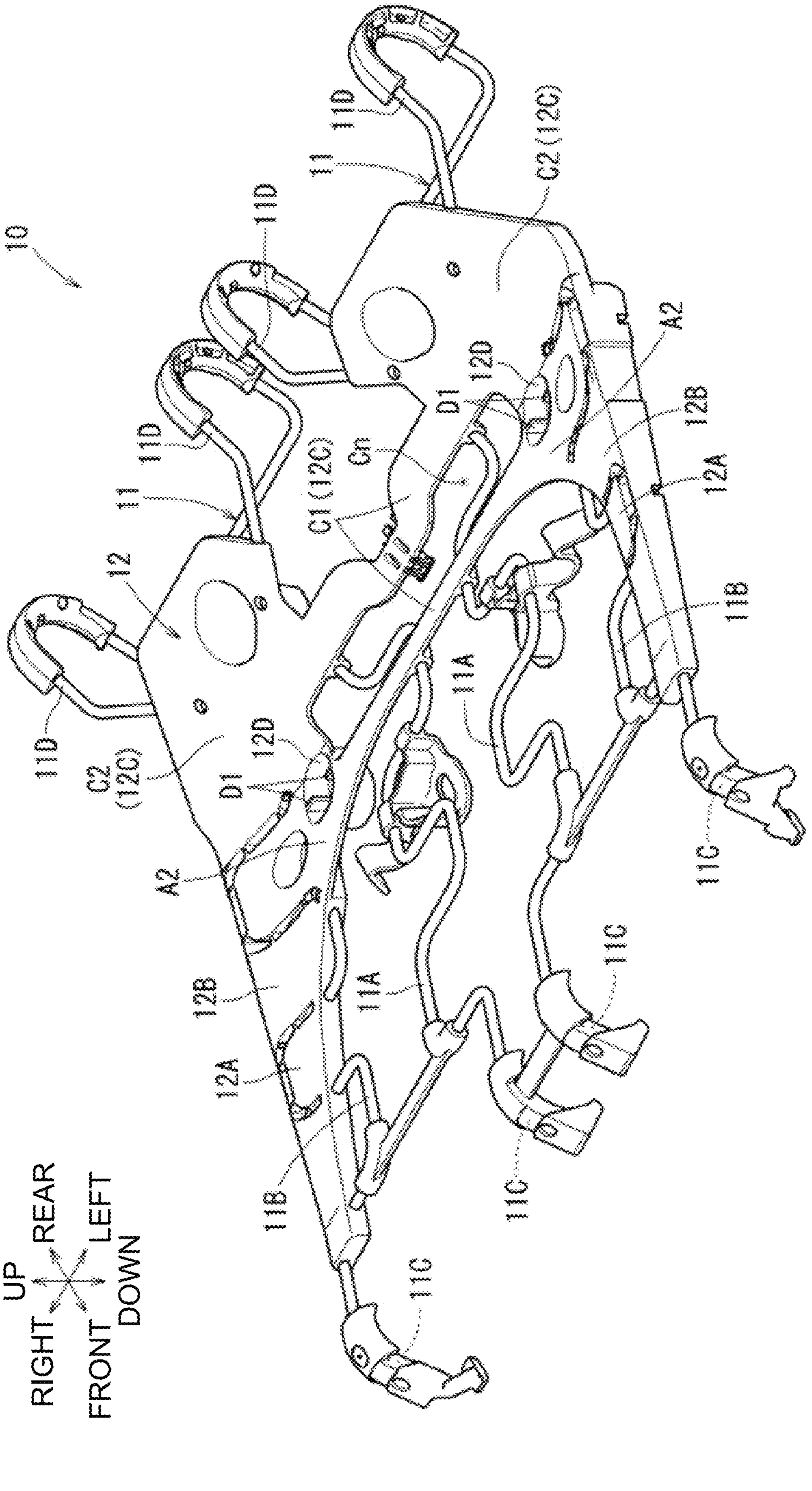
FIG. 3 is a perspective view of the cushion spring.
Figure 4:
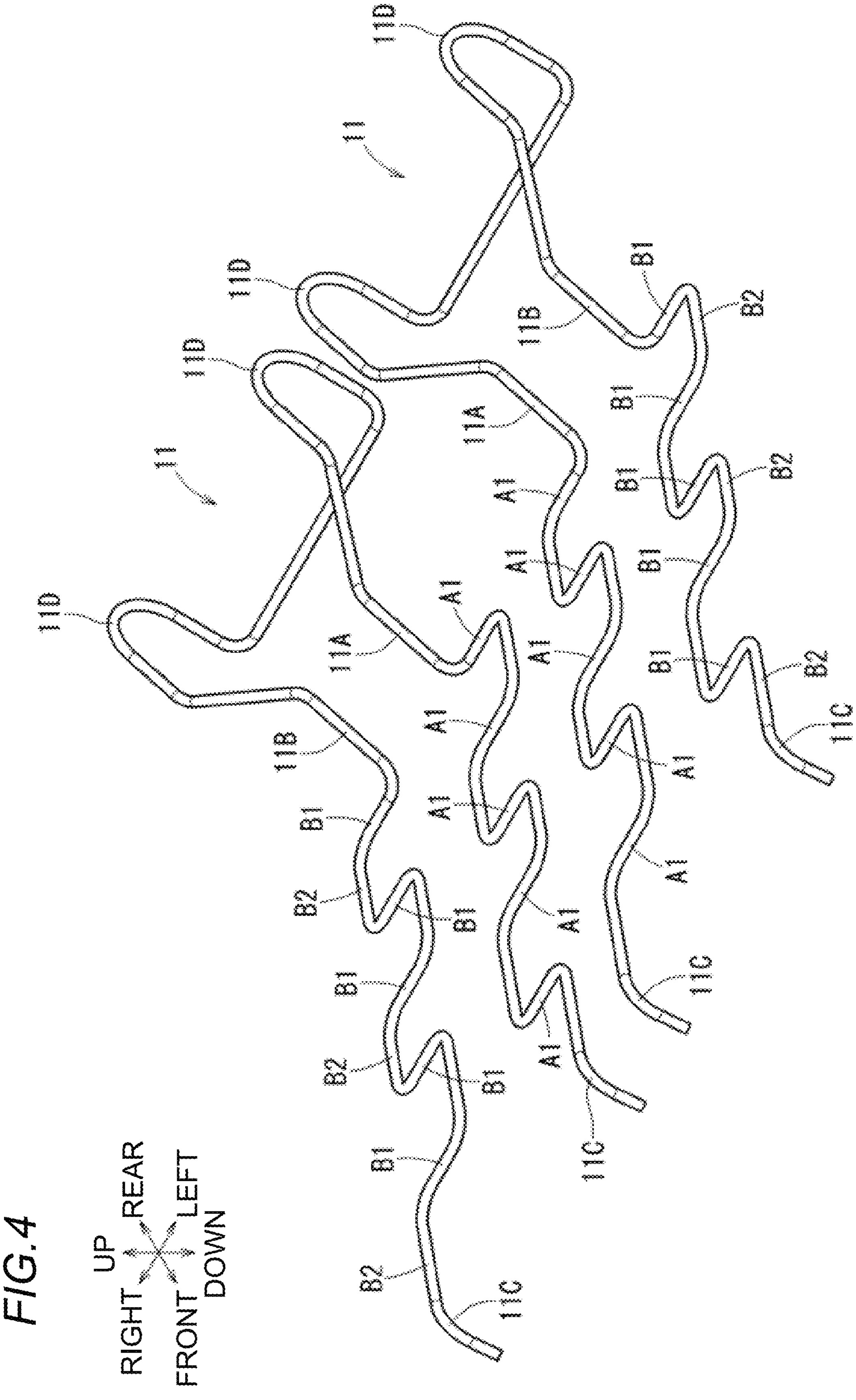
FIG. 4 is a perspective view of a formed wire.

As illustrated in FIG. 3, the cushion spring 10 includes a pair of left and right formed wires 11 each formed of a rod-shaped processed spring bent in a U shape in a plan view, and a resin member 12 formed in a U shape in a plan view and joined to each formed wire 11. As illustrated in FIG. 4, each formed wire 11 is formed of one wire bent in a U shape in a plan view.

Specifically, each formed wire 11 is formed of a wire having a U shape in a plan view which is bent to have a center wire 11A and a side wire 11B. The center wire 11A and the side wire 11B are arranged side by side in the seat width direction and extend in the seat front-rear direction. The center wire 11A and the side wire 11B present a U shape in a plan view in which rear ends thereof are connected to each other and front ends thereof are spaced apart from each other.

Each formed wire 11 has a symmetrical shape in the seat width direction. Further, the formed wires 11 are arranged in a manner of being symmetrical to each other in the seat width direction. As illustrated in FIG. 3, each formed wire 11 is provided such that a wire arranged on a center side of the seat cushion frame 2 in the seat width direction is defined as the center wire 11A and a wire arranged on an outer side is defined as the side wire 11B.

At each of the front ends of the center wire 11A and the side wire 11B of each formed wire 11, a front hooking portion 11C is formed that is bent in a shape allowing the front hooking portion 11C to be hooked on the front pipe 2B from above. Further, at each of the rear ends of the center wire 11A and the side wire 11B of each formed wire 11, a rear hooking portion 11D is formed that is bent in a shape allowing the rear hooking portion 11D to be hooked on the rear pipe 2C from above.

As illustrated in FIG. 4, the center wire 11A of each formed wire 11 is formed with a plurality of crank-shaped portions A1 that are bent in a manner of folding in a crank shape to one side and the other side in the seat width direction alternately, and the side wire 11B of each formed wire 11 is formed with a plurality of crank-shaped portions B1 that are bent in a manner of folding to one side and the other side in the seat width direction alternately. In each formed wire 11, the crank-shaped portions A1 formed in the center wire 11A and the crank-shaped portions B1 formed in the side wire 11B are formed symmetrically in the seat width direction such that the crank-shaped portions A1 and B1 approach or separate from each other in the seat width direction.

With the crank-shaped portions A1 and B1, each formed wire 11 has a shape extending in the seat width direction as well as in the seat front-rear direction. Accordingly, each formed wire 11 is able to planarly support the seat cushion pad 3 (see FIG. 1) from a pad back side.

Figure 7:
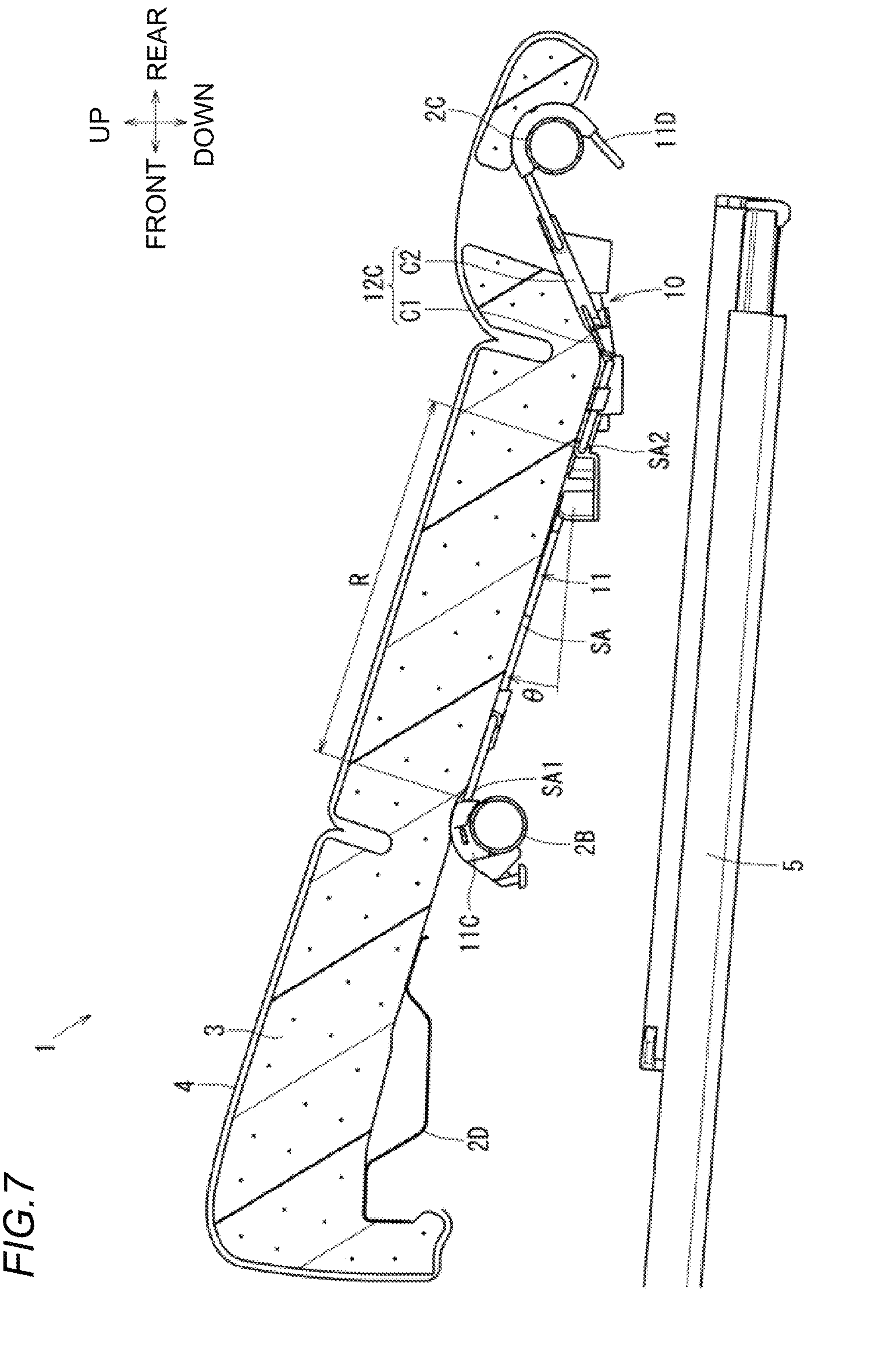
FIG. 7 is a cross-sectional view of the seat cushion taken along a vertical plane passing through a center in a seat width direction.

Each formed wire 11 is formed such that the center wire 11A and the side wire 11B thereof are bent in a V shape in a side view. As illustrated in FIG. 7, with the bending of the V shape in each formed wire 11, a variation in ischium supporting reaction force due to a difference in the body size of the seated occupant is less likely to occur in an ischium supporting portion SA that supports an ischium of the seated occupant via the seat cushion pad 3. Details will be described later.

As illustrated in FIG. 3, the resin member 12 is joined to the formed wires 11 in a manner of being symmetrical in the seat width direction. Specifically, the resin member 12 includes a pair of deflection restricting portions 12A that are joined to the formed wires 11 in a manner of extending in the seat front-rear direction along the side wires 11B respectively.

Further, the resin member 12 has a pad supporting surface 12B that forms an upper surface of each deflection restricting portion 12A. Each pad supporting surface 12B is formed at a position higher than the side wire 11B, and forms a support surface that planarly supports the seat cushion pad 3 (see FIG. 1) from the pad back side.

Figure 6:
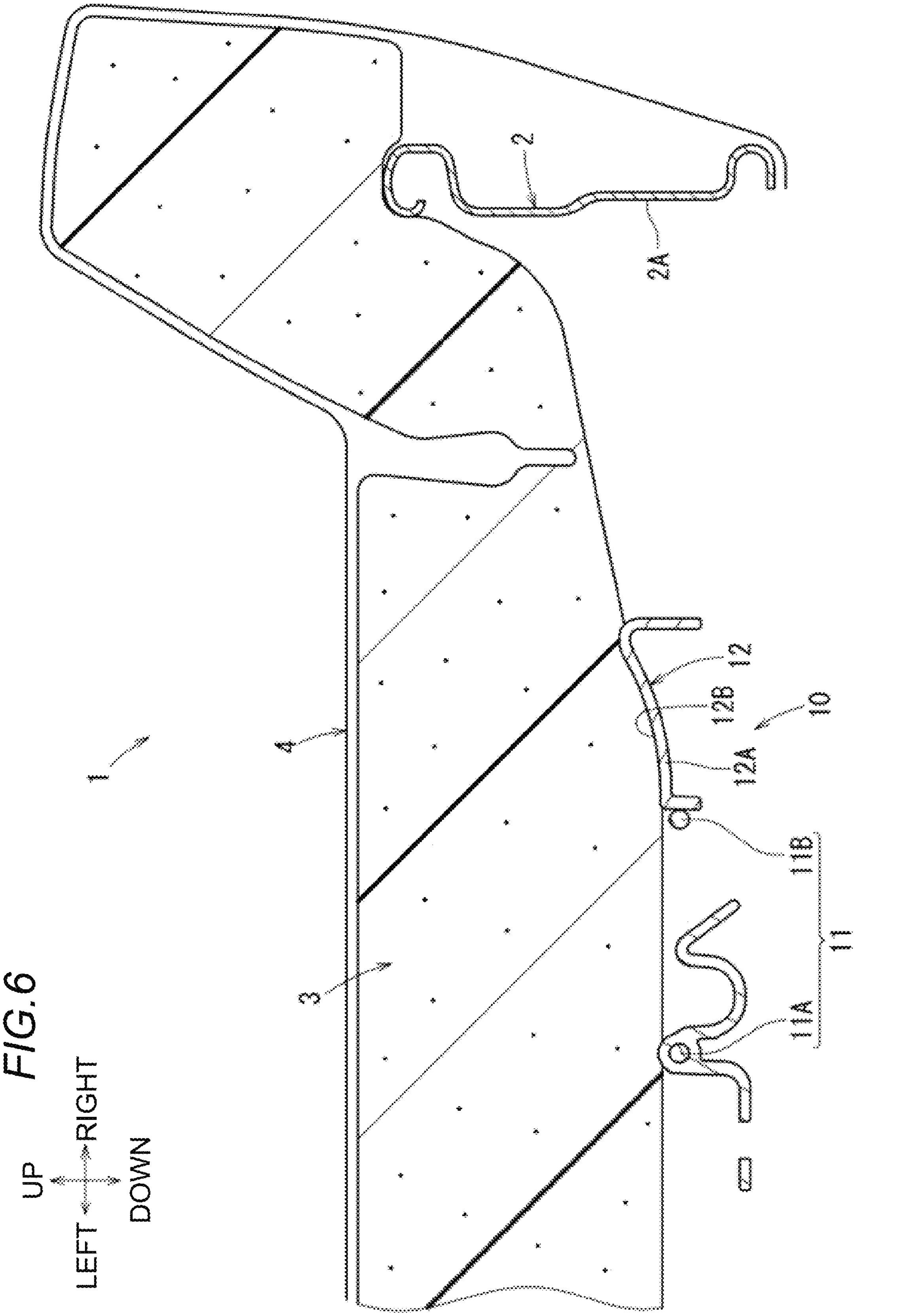
FIG. 6 is a cross-sectional view of the seat cushion taken along a line VI-VI in FIG. 5.

As illustrated in FIG. 6, each pad supporting surface 12B planarly supports the seat cushion pad 3 from the pad back side, at an angle of facing obliquely inward. Accordingly, the thighs of the seated occupant can be widely and planarly supported from oblique outer sides by the deflection restricting portions 12A. Each deflection restricting portion 12A includes edge portions formed on an inner edge and an outer edge of the deflection restricting portion 12A in the seat width direction, each edge portion extending along the corresponding edge in a shape of bending downward.

Figure 5:
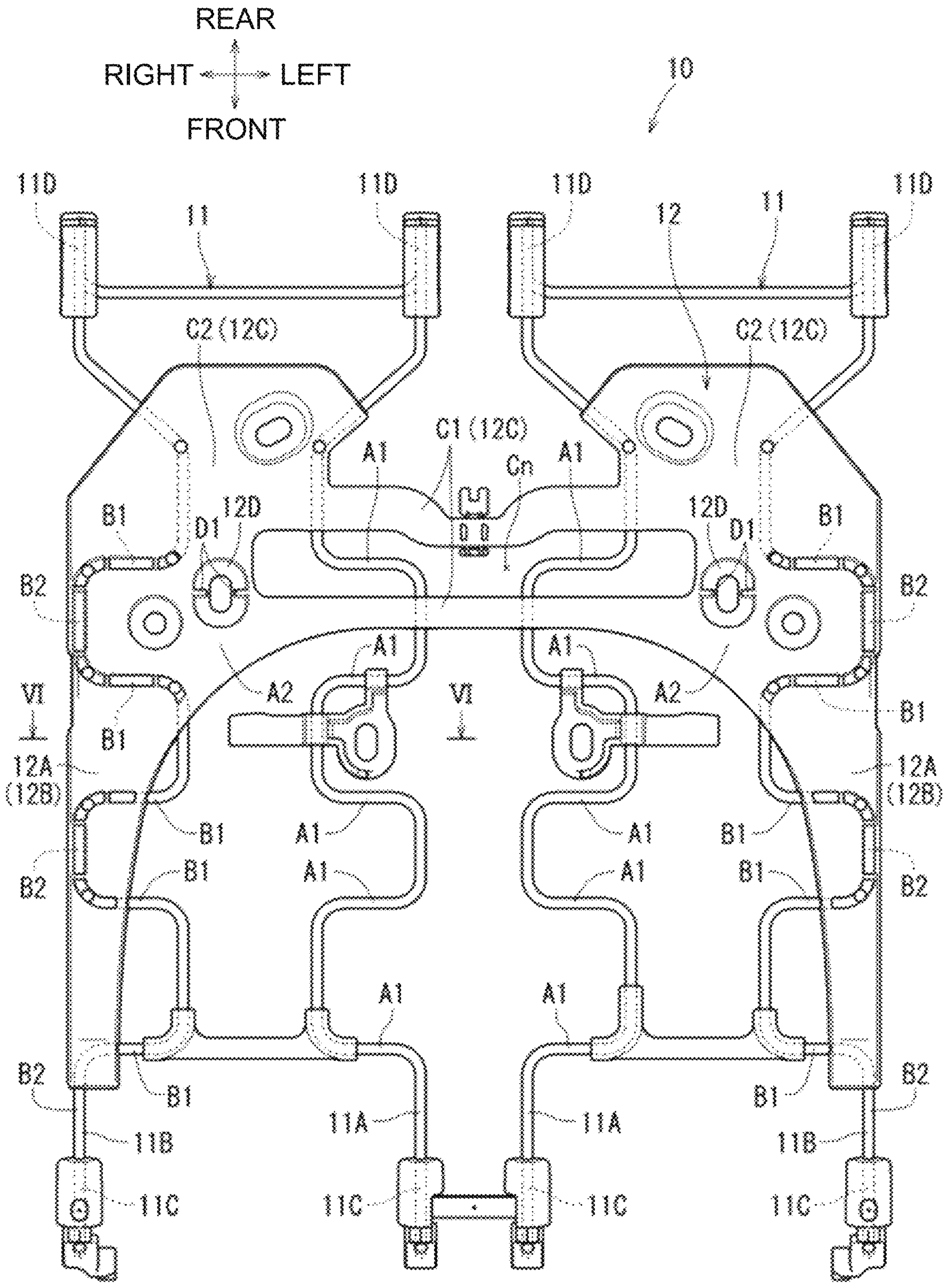
FIG. 5 is a plan view of the cushion spring.

As illustrated in FIG. 5, the pair of deflection restricting portions 12A extend to a position where the deflection restricting portions 12A are connected to a rear connecting portion 12C located on a seat rear side of the ischium supporting portion SA (see FIG. 7). Accordingly, the pair of deflection restricting portions 12A can also support the bases (the greater trochanters and the lesser trochanters) of the thighs of the seated occupant from oblique outer sides. As a result, wobbling of a posture of the seated occupant in a roll direction can be appropriately restricted.

The resin member 12 further includes the rear connecting portion 12C that extends in the seat width direction to connect rear portions of the deflection restricting portions 12A. The resin member 12 is integrally joined to the formed wires 11 by integral molding with the formed wires 11. With the configuration including the pair of deflection restricting portions 12A and the rear connecting portion 12C, the resin member 12 is formed in a U shape whose opening defined by the deflection restricting portions 12A face a seat front side.

Next, a detailed configuration of the resin member 12 will be described. As illustrated in FIG. 5, each deflection restricting portion 12A is formed in a manner of continuously extending in the seat front-rear direction along linear longitudinal wire portions B2 of the corresponding side wire 11B. The longitudinal wire portions B2 extend intermittently in the seat front-rear direction between the corresponding front hooking portion 11C and the corresponding rear hooking portion 11D. The longitudinal wire portions B2 of each side wire 11B are formed at positions on the same straight line.

Accordingly, each deflection restricting portion 12A is formed to connect all the crank-shaped portions B1 of the corresponding side wire 11B that are adjacent to each other in the front-rear direction. Each deflection restricting portion 12A includes an expanding portion A2 that is expanded such that a connecting width in the seat width direction of a portion connecting the crank-shaped portions B1 is continuously increased toward the seat rear side on an inner side in the seat width direction.

Each expanding portion A2 has a shape of expanding so as to define an inner peripheral edge in a recessed curved surface shape in a plan view along an outer edge of the hip portion of the seated occupant. With the expanding portion A2, each deflection restricting portion 12A has a shape in which a connecting width of a portion connecting the foremost crank-shaped portion B1 and the second crank-shaped portion B1 counting from the front of the corresponding side wire 11B is the smallest.

Each deflection restricting portion 12A has a shape in which a connecting width of a portion connecting the second crank-shaped portion B1 from the front and the third crank-shaped portion B1 from the front of the corresponding side wire 11B is wider. Each deflection restricting portion 12A has a shape in which a connecting width of a portion connecting the third crank-shaped portion B1 from the front and the fourth crank-shaped portion B1 from the front of the corresponding side wire 11B is further wider.

Specifically, each deflection restricting portion 12A has a shape of, at the middle of a portion connecting the third crank-shaped portion B1 from the front and the fourth crank-shaped portion B1 from the front of the corresponding side wire 11B, expanding beyond the third crank-shaped portion B1 and the fourth crank-shaped portion B1 on the inner side in the seat width direction and being connected to the rear connecting portion 12C. In this sense, each expanding portion A2, which expands beyond the third crank-shaped portion B1 from the front and the fourth crank-shaped portion B1 from the front on the inner side in the seat width direction from the middle of the portion connecting the third crank-shaped portion B1 and the fourth crank-shaped portion B1, is a part of the rear connecting portion 12C.

Each deflection restricting portion 12A is not formed at a position corresponding to a position directly below the ischium (not illustrated) of the seated occupant, and is formed at a position retracted to the outer side in the seat width direction from the position directly below the ischium. Further, the rear connecting portion 12C is not formed at a position corresponding to a position directly below the ischium of the seated occupant, and is formed at a position retracted to the seat rear side from the position directly below the ischium.

Further, each formed wire 11 is not formed at a position corresponding to a position directly below the ischium (not illustrated) of the seated occupant, and is formed at a position deviated from the position directly below the ischium in the seat width direction. Specifically, the formed wires 11 are formed at positions deviated to the inner side and the outer side in the seat width direction from the position directly below the ischium (not illustrated) so that the center wire 11A and the side wire 11B of one formed wire 11 sandwich a position corresponding to a position directly below the left ischium (not illustrated) of the seated occupant and the center wire 11A and the side wire 11B of the other formed wire 11 sandwich a position corresponding to a position directly below the right ischium (not illustrated) of the seated occupant.

With the deflection restricting portion 12A, a divergence between the crank-shaped portions B1 arranged by five in the front-rear direction of each side wire 11B of each formed wire 11 is restricted. Specifically, in each side wire 11B, the divergence in the seat front-rear direction between the foremost crank-shaped portion B1 and the second crank-shaped portion B1 from the front is restricted on a lowest level by the shape in which the connecting width of the corresponding deflection restricting portion 12A changes.

Further, in each side wire 11B, the divergence in the seat front-rear direction between the second crank-shaped portion B1 from the front and the third crank-shaped portion B1 from the front is restricted on a high level. Further, in each side wire 11B, the divergence in the seat front-rear direction between the third crank-shaped portion B1 from the front and the fourth crank-shaped portion B1 from the front is restricted on a higher level.

Further, in each side wire 11B, since the fourth crank-shaped portion B1 from the front and the fifth crank-shaped portion B1 from the front are connected to each other over the entire region in the seat width direction by the corresponding deflection restricting portion 12A, the divergence in the seat front-rear direction therebetween is completely restricted. With the resin member 12, even when the formed wires 11 are formed symmetrically to each other in the seat width direction, the cushion spring 10 has different flexibility in the center wire 11A and the side wire 11B of each formed wire 11 at the time of receiving a load from the seated occupant.

Specifically, as illustrated in FIG. 6, when the cushion spring 10 receives a load from the seated occupant, each center wire 11A is deflected in a manner of sinking downward relatively flexibly. On the other hand, deflection of each side wire 11B is restricted so that the side wire 11B is less likely to sink downward than each center wire 11A.

Specifically, the load from the seated occupant decreases from the rear portion of the seat toward the front portion of the seat, and the level of deflection restriction of each side wire 11B gets lower toward the front side and gets higher toward the rear side by the shape in which the connecting width of each deflection restricting portion 12A changes. Accordingly, roll rigidity of each side portion of the seat cushion 1 can be appropriately increased.

The pad supporting surface 12B forming the upper surface of each deflection restricting portion 12A functions as a receiving surface of the seat cushion pad 3 when the load of the seated occupant is applied to each side portion of the seat cushion 1. Since each pad supporting surface 12B is provided integrally with the corresponding side wire 11B of the cushion spring 10 whose deflection is restricted, the pad supporting surfaces 12B are less likely to sink downward and can stably receive the load.

More specifically, since the pad supporting surfaces 12B are integrally connected to each other by the rear connecting portion 12C, when a load from the seated occupant is applied to one pad supporting surface 12B, the load is also transmitted to the side wire 11B on the opposite side via the other pad supporting surface 12B. Accordingly, when the load of the seated occupant is applied to the side portions of the seat cushion 1, the pad supporting surfaces 12B are less likely to sink downward and can stably receive the load.

As illustrated in FIG. 5, the rear connecting portion 12C of the resin member 12 includes a central connecting portion C1 that connects the left and right center wires 11A, and a pair of side connecting portions C2 which connect the side wire 11B and the center wire 11A on the left and the side wire 11B and the center wire 11A on the right. The central connecting portion C1 and the left and right side connecting portions C2 are formed to have a flush upper surface.

An opening Cn penetrating in a manner of extending in an elongated hole shape in the seat width direction is formed in a central portion of the central connecting portion C1 in the seat front-rear direction. In the central connecting portion C1, a part of the crank-shaped portion A1 of each center wire 11A from the opening Cn is exposed. Accordingly, when a load is applied from the seated occupant, the crank-shaped portion A1 of each center wire 11A is likely to deflect at the part exposed from the opening Cn in the central connecting portion C1. The central connecting portion C1 may be integrally coupled to the center wires 11A over the entire region thereof without being provided with the opening Cn as described above.

As illustrated in FIG. 3, the upper surfaces of the central connecting portion C1 and the left and right side connecting portions C2 are formed at positions higher than the center wires 11A and the side wires 11B connected by the central connecting portion C1 and the left and right side connecting portions C2. The upper surfaces of the central connecting portion C1 and the left and right side connecting portions C2 form support surfaces for planarly supporting the seat cushion pad 3 (see FIG. 1) from the pad back side. As illustrated in FIG. 7, the upper surfaces of the central connecting portion C1 and the left and right side connecting portions C2 form support surfaces that planarly support the seat cushion pad 3 from the pad back side at an angle of facing obliquely forward.

Accordingly, the central connecting portion C1 and the left and right side connecting portions C2 can support, widely and planarly the rear hip portion on the rear side of the ischium of the seated occupant obliquely from the rear side. Accordingly, wobbling of the pelvis of the seated occupant in the roll direction can be appropriately restricted. As a result, it is possible to appropriately restrict forward slip due to the wobbling of the hip portion of the seated occupant.

As illustrated in FIGS. 3 and 5, recessed clamp portions 12D capable of clamping a wire harness (an object that is not illustrated) from a seat back side are formed in the left and right side connecting portions C2 of the rear connecting portion 12C. Each of the clamp portions 12D is formed in a recessed shape recessed in a longitudinal oval shape in a plan view from the upper surface of the left and right side connecting portions C2.

In the recess of each clamp portion 12D, ribs D1 are formed that project from left and right inner peripheral surfaces of the clamp portion 12D in a symmetrical standing plate shape. Each rib D1 is formed such that a bottom surface thereof is connected to a bottom surface of the corresponding clamp portion 12D. Each rib D1 is formed such that an upper surface thereof is flush with the upper surfaces of the left and right side connecting portions C2. With the ribs D1, even when the recessed clamp portions 12D are formed on the upper surfaces of the left and right side connecting portions C2, it is possible to appropriately secure, on the upper surfaces of the side connecting portions C2, a support surface for supporting the seat cushion pad 3 (see FIG. 1) from the pad back side.

As illustrated in FIG. 5, a groove, which is recessed along the shape of each side wire 11B and formed in each pad supporting surface 12B, is a groove through which a pressing pin (not illustrated) for fixing the position of the corresponding formed wire 11 in a mold of the resin member 12 is passed.

As illustrated in FIG. 7, the ischium supporting portion SA formed at each formed wire 11 is formed in a shape with which a variation in the ischium supporting reaction force due to a difference in the body size of the seated occupant is less likely to occur. Specifically, the ischium supporting portion SA is configured such that the entire region R in the seat front-rear direction between a first ischium supporting portion SA1, which serves as a supporting portion of the ischium when an AM95 mannequin is seated, and a second ischium supporting portion SA2, which serves as a supporting portion of the ischium when a JM32 mannequin is seated, is formed as a flush spring surface having no bending in a seat up-down direction in a side view.

Here, the AM95 mannequin is a mannequin having a relatively large body size corresponding to 95% of an American male. The JM32 mannequin is a mannequin having a relatively small body size corresponding to 32% of a Japanese male. Accordingly, most of the human body sizes correspond to a body size between the AM95 mannequin and the JM32 mannequin.

The ischium supporting portion SA has a shape of extending straight in a forward rising manner in the region R in the side view. The portion of the seat cushion pad 3 disposed on the region R of the ischium supporting portion SA is formed such that a pad thickness thereof in a direction orthogonal to the extending direction of the ischium supporting portion SA is constant.

With such a configuration, when persons having body sizes of the AM95 mannequin and the JM32 mannequin and body sizes therebetween are seated on the seat cushion 1, the cushion spring 10 supports the ischium such that substantially the same ischium supporting reaction force acts on the ischium supporting portion SA. Accordingly, it is possible to appropriately restrict the variation in the ischium supporting reaction force due to the difference in the body size of the seated occupant.

Accordingly, even when the pad thickness of the seat cushion pad 3 disposed on the region R of the ischium supporting portion SA is small, a pressure by seating acting on the ischium of the seated occupant can be appropriately dispersed regardless of the body size. The region R of the ischium supporting portion SA is a region of an intermediate portion in which both ends of a linear portion extending linearly between a bending point, at which each formed wire 11 is bent in a V shape in a side view, and an end point of curvature of the front hooking portion 11C are left.

More specifically, the cushion spring 10 is bridged to the seat cushion frame 2 such that the spring surface of the ischium supporting portion SA rises forward at an angle $\theta$ of about 20 degrees with respect to a rail length direction in which the slide rail 5 extends. With the angle $\theta$ of the cushion spring 10 rising forward, it is possible to appropriately restrict the forward slip of the hip portion of the seated occupant.

As described above with reference to FIG. 5, the center wire 11A and the side wire 11B of one formed wire 11 are disposed at positions deviated in the seat width direction from a position corresponding to a position directly below the left ischium (not illustrated) of the seated occupant, and the center wire 11A and the side wire 11B of the other formed wire 11 are disposed at positions deviated in the seat width direction from a position corresponding to a position directly below the right ischium (not illustrated). More specifically, the center wire 11A and the side wire 11B of each formed wire 11 are deviated in the seat width direction from a position corresponding to a position directly below the ischium when the AM95 mannequin is seated and from a position corresponding to a position directly below the ischium when the JM32 mannequin is seated.

With the above configuration, the pressure by seating acting on the ischium of the seated occupant can be appropriately dispersed regardless of the body size.

To summarize the above, the cushion spring 10 according to the present embodiment may have the following configuration. In the following description, reference signs assigned in parentheses correspond to the configurations described in the above embodiment.

That is, a cushion spring (10) is a spring that is bridged to a seat cushion frame (2) in a seat front-rear direction and receives a load of a seated occupant by a surface thereof. The cushion spring (10) includes a pair of formed wires (11) that are bridged to the seat cushion frame (2) in the seat front-rear direction and arranged side by side in a seat width direction, and a resin member (12) that is joined to the pair of formed wires (11).

The pair of formed wires (11) each have a center wire (11A) and a side wire (11B) arranged side by side in the seat width direction and extending in the seat front-rear direction. The center wire (11A) and the side wire (11B) are arranged in this order from a center of the seat cushion frame (2) to an outer side in the seat width direction. The resin member (12) includes a rear connecting portion (12C) and a pair of deflection restricting portions (12A).

The rear connecting portion (12C) extends to connect the side wire (11B) and the center wire (11A) and the center wires (11A) in the seat width direction in a region on a seat rear side of an ischium supporting portion (SA) of the pair of formed wires (11) that supports an ischium of the seated occupant via a seat cushion pad (3). The pair of deflection restricting portions (12A) extend from the rear connecting portion (12C) to connect, in the seat front-rear direction, all crank-shaped portions (B1) that are formed in the side wires (11B) and bent in a manner of repeatedly folding in the seat width direction.

According to the above configuration, when a load of the seated occupant is applied to one of the formed wires (11), the load is also transmitted to the other of the formed wires (11) by the rear connecting portion (12C) of the resin member (12). As a result, the formed wires (11) are less likely to sink downward and can receive the load stably. Further, the deflection restricting portions (12A) of the resin member (12) can effectively restrict the deflection of the crank-shaped portions (B1) formed in the side wires (11B). Accordingly, each side wire (11B) is less likely to sink downward when a load of a seated occupant is received by a surface thereof. As a result, roll rigidity of a side portion of a seat cushion (1) is appropriately increased.

Further, the pair of deflection restricting portions (12A) planarly support the seat cushion pad (3) from a pad back side at an angle of facing obliquely inward, at a position higher than the side wires (11B) connected by the pair of deflection restricting portions (12A). According to the above configuration, the thighs of the seated occupant can be widely and planarly supported from oblique outer sides by the pair of deflection restricting portions (12A). The pair of deflection restricting portions (12A) extend to a position where the deflection restricting portions (12A) are connected to the rear connecting portion (12C) located on the seat rear side of the ischium supporting portion (SA). Accordingly, the pair of deflection restricting portions (12A) can also support the bases (the greater trochanters and the lesser trochanters) of the thighs from the oblique outer sides. As a result, wobbling of a posture of the seated occupant in a roll direction can be appropriately restricted.

The rear connecting portion (12C) includes a central connecting portion (C1) that connects the center wires (11A) and a pair of side connecting portions (C2) each of which connects the corresponding side wire (11B) and center wire (11A). The central connecting portion (C1) and the pair of side connecting portions (C2) planarly support the seat cushion pad (3) from the pad back side at an angle of facing obliquely forward, at a position higher than the center wires (11A) and the side wires (11B) connected by the central connecting portion (C1) and the pair of side connecting portions (C2).

According to the above configuration, the central connecting portion (C1) and the pair of side connecting portions (C2) can support, widely and planarly the rear hip portion on the rear side of the ischium of the seated occupant obliquely from the rear side. Accordingly, wobbling of the pelvis of the seated occupant in the roll direction can be appropriately restricted. As a result, it is possible to appropriately restrict forward slip due to the wobbling of the hip portion of the seated occupant.

Further, the rear connecting portion (12C) includes a recessed clamp portion (12D) that is recessed from a seat front side toward a seat back side so as to clamp an object (a wire harness that is not illustrated) from the seat back side, and a rib (D1) that projects in the recess of the clamp portion (12D) so as to form an upper surface flush with the rear connecting portion (12C). According to the above configuration, even when the recessed clamp portion (12D) is formed in the rear connecting portion (12C), a support surface for supporting the seat cushion pad (3) from the pad back side can be appropriately secured in the rear connecting portion (12C).

Second Embodiment

Figure 8:
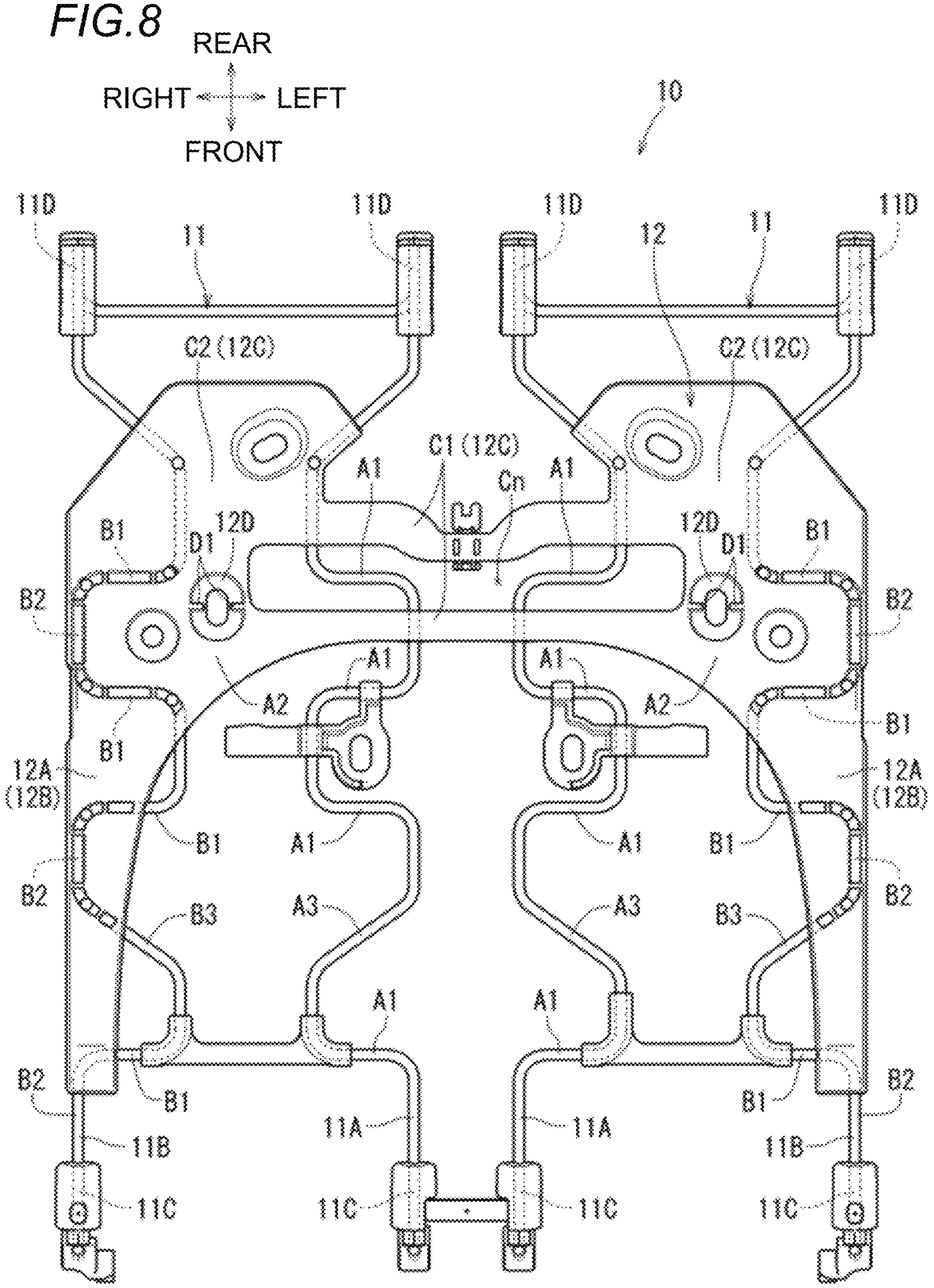
FIG. 8 is a plan view of illustrating a schematic configuration of a cushion spring according to a second embodiment.

Next, a configuration of the cushion spring 10 according to a second embodiment of the present disclosure will be described with reference to FIG. 8. In the present embodiment, a second crank-shaped portion A3 from the front of each center wire 11A and a second crank-shaped portion B3 from the front of each side wire 11B are bent not in an orientation of extending straight in a seat width direction but in an orientation of extending obliquely in a seat front-rear direction.

Specifically, the crank-shaped portions A3 and B3 are formed as follows in comparison with the second crank-shaped portions A1 and B1 from the front described in the first embodiment. That is, each crank-shaped portion A3 is bent in an orientation of extending obliquely forward so as to narrow a gap between the crank-shaped portion A3 and the crank-shaped portions A1 arranged on the front side without narrowing a gap between the crank-shaped portion A3 and the crank-shaped portions A1 arranged on the rear side. Further, each crank-shaped portion B3 is bent in an orientation of extending obliquely forward so as to narrow a gap between the crank-shaped portion B3 and the crank-shaped portions B1 arranged on the front side without narrowing a gap between the crank-shaped portion B3 and the crank-shaped portions B1 arranged on the rear side. Accordingly, the gap between the crank-shaped portion A3 of each center wire 11A and the crank-shaped portion A1 arranged on the rear side of the crank-shaped portion A3 is widened compared to that in the configuration described in the first embodiment.

As a result, for example, even when the seated occupant has a large body size and the ischium thereof is positioned relatively closer to the front side, the pressure by seating acting on the ischium of the seated occupant can be reduced by the shape of the crank-shaped portion A3 of each center wire 11A that extends obliquely forward. Since the crank-shaped portion A3 of each center wire 11A has a shape of extending obliquely forward, a bending angle of a leading corner portion is gentler than a bending angle of a corner portion of the second crank-shaped portion A1, B1 from the front described in the first embodiment.

Accordingly, the pressure by seating acting on the ischium of the seated occupant can be more appropriately reduced. Since configurations other than the above are the same as the configurations described in the first embodiment, the same reference signs are given and the description thereof is omitted.

Third Embodiment

Figure 9:
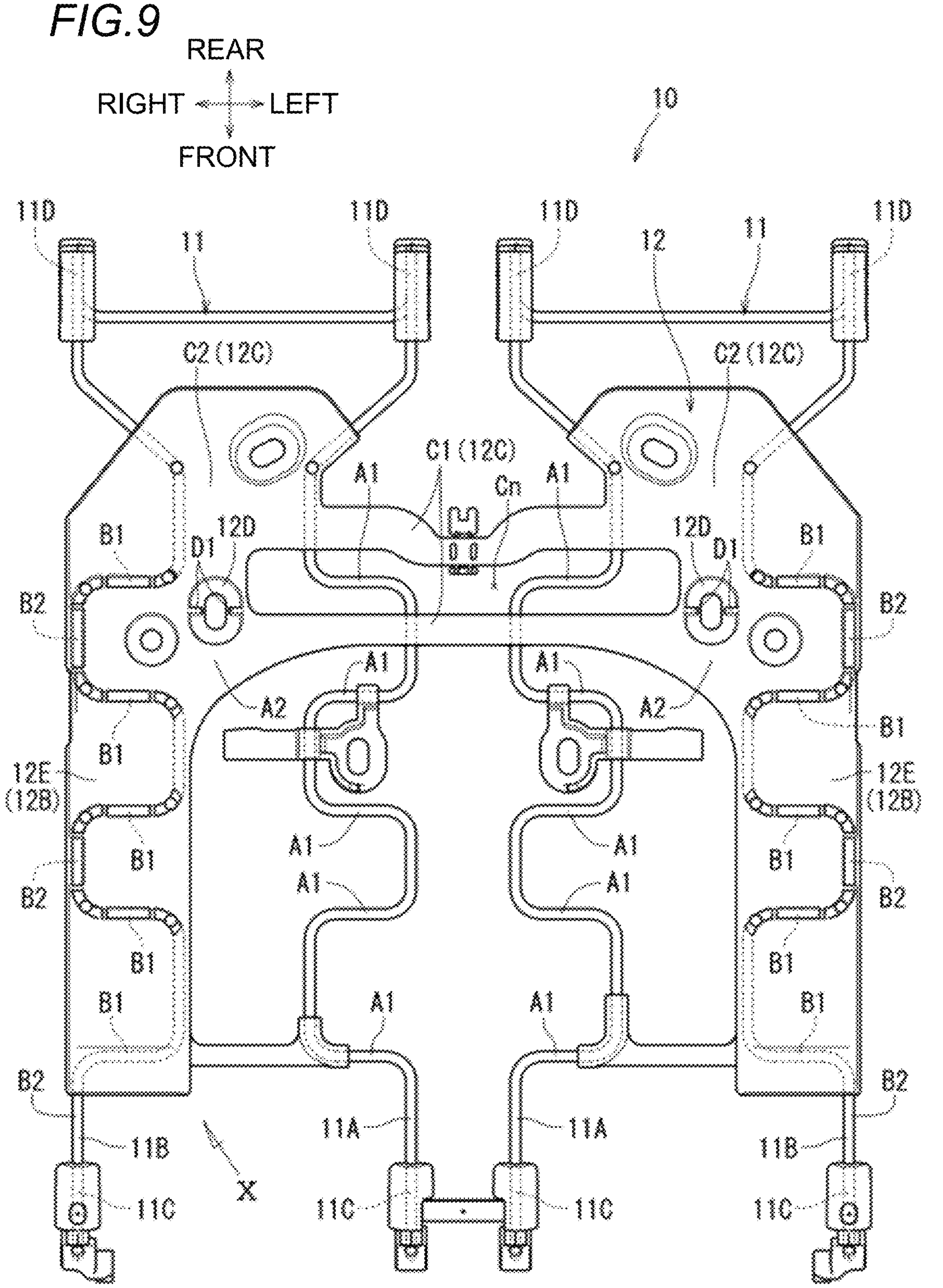
FIG. 9 is a plan view of illustrating a schematic configuration of a cushion spring according to a third embodiment.
Figure 10:
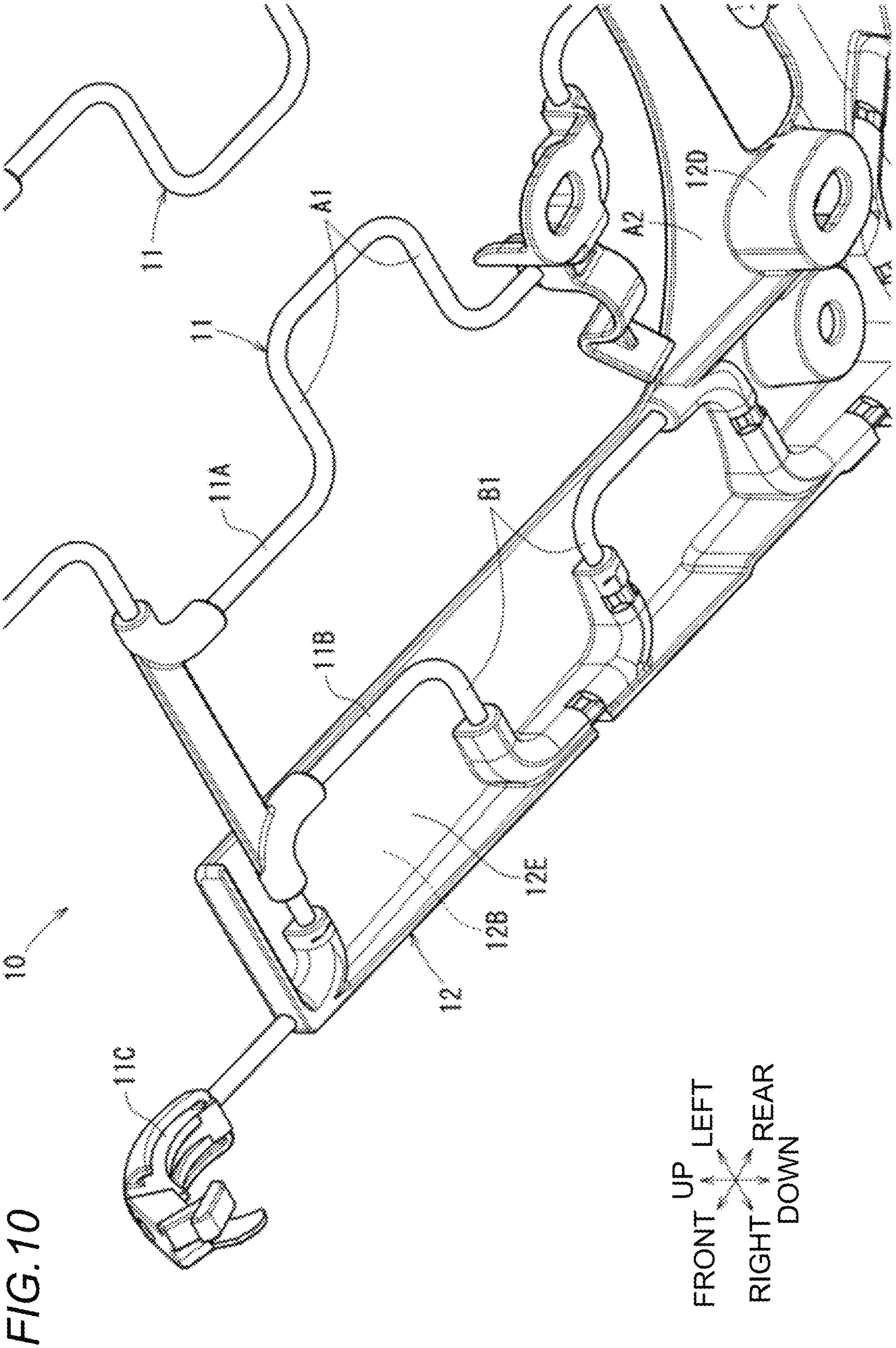
FIG. 10 is a fragmentary view taken in a direction of an arrow X in FIG. 9.

Next, a configuration of a cushion spring 10 according to a third embodiment of the present disclosure will be described with reference to FIGS. 9 and 10. In the present embodiment, each deflection restricting portion 12E that is joined to the corresponding side wire 11B of the resin member 12 has a shape of extending in a cylinder shape so as to connect, in a seat front-rear direction over the entire region in a seat width direction, all the crank-shaped portions B1 formed in the corresponding side wire 11B.

Each deflection restricting portion 12E is formed in a shape of projecting slightly to an inner side in the seat width direction of all the crank-shaped portions B1 of the corresponding side wire 11B. As illustrated in FIG. 10, each deflection restricting portion 12E is integrally joined to an inner end and an outer end of the foremost crank-shaped portion B1, outer ends of the second and third crank-shaped portions B1 from the front, and an inner end and an outer end of the fourth crank-shaped portion B1 from the front in the corresponding side wire 11B.

Accordingly, a divergence in the seat front-rear direction between all the crank-shaped portions B1 of each side wire 11B is completely restricted by the corresponding deflection restricting portion 12E. As a result, roll rigidity of a side portion of the seat cushion 1 can be further increased.

For example, even when a seated occupant has a relatively small body size and the thighs thereof are positioned relatively closer to the inner side, the deflection restricting portions 12E can planarly support the distal portion to the base of the thighs widely from a pad back side.

Of each deflection restricting portion 12E, an inner edge in the seat width direction is thinner than an outer edge. Specifically, each deflection restricting portion 12E is a flat plate extending from the inner edge to the outer edge with a substantially constant thickness. However, the outer edge of each deflection restricting portion 12E is formed with an edge portion extending along the outer edge in a shape of bending downward. Further, a bottom surface of each deflection restricting portion 12E is formed with padding portions at respective places each of which serves as a joining portion to the corresponding side wire 11B.

Each deflection restricting portion 12E has a configuration in which the inner edge is thinner than the outer edge since the inner edge in the seat width direction is not formed with a bent edge portion as the outer edge. Accordingly, the inner edge of each deflection restricting portion 12E is more likely to be deflected than the outer edge. A portion of the inner edge of each deflection restricting portion 12E that is joined to each crank-shaped portion B1 of the corresponding side wire 11B is partially padded.

With the thin structure described above, it is possible to smoothen a change in hardness between a portion where the deflection restricting portion 12E is provided and a portion on the inner side in the seat width direction. As a result, when the deflection restricting portions 12E are provided, it is also possible to appropriately improve the performance in dispersing the pressure by seating when seated. The configuration in which the inner edge of each deflection restricting portion 12E is thinner than the outer edge may be a configuration in which the plate thickness of each deflection restricting portion 12E is reduced gradually from the outer edge to the inner edge or a configuration in which a plate thickness of the inner edge is partially reduced. Since configurations other than the above are the same as the configurations described in the first embodiment, the same reference signs are given and the description thereof is omitted.

Fourth Embodiment

Next, a configuration of a cushion spring 10 according to a fourth embodiment of the present disclosure will be described with reference to FIGS. 11 and 12. In the present embodiment, each deflection restricting portion 12A of the resin member 12 has an external projecting portion A4. The external projecting portion A4 projects outward beyond the most external projecting portion of the corresponding side wire 11B in a seat width direction and planarly supports the seat cushion pad 3 from a pad back side.

Figure 11:
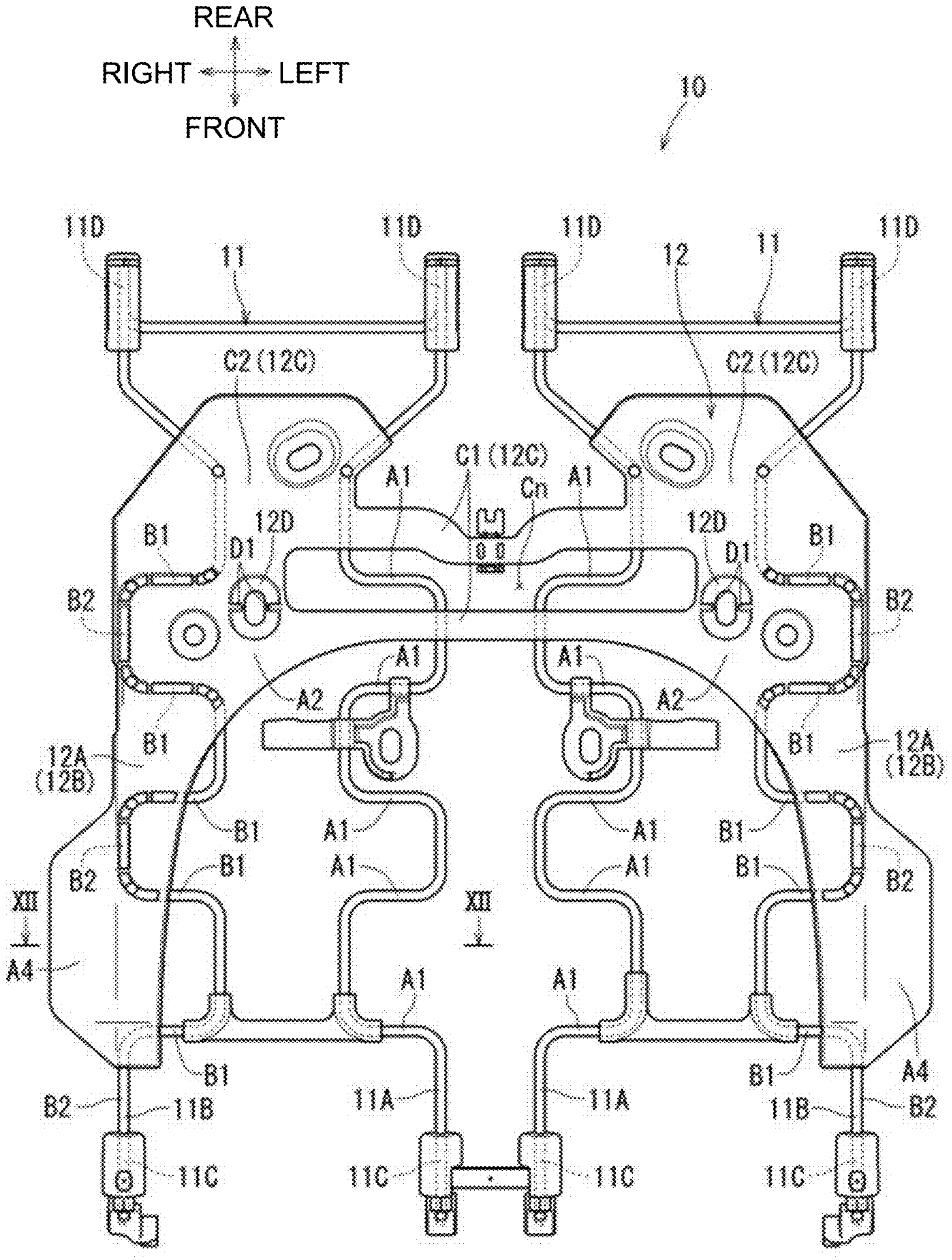
FIG. 11 is a plan view of illustrating a schematic configuration of a cushion spring according to a fourth embodiment.
Figure 12:
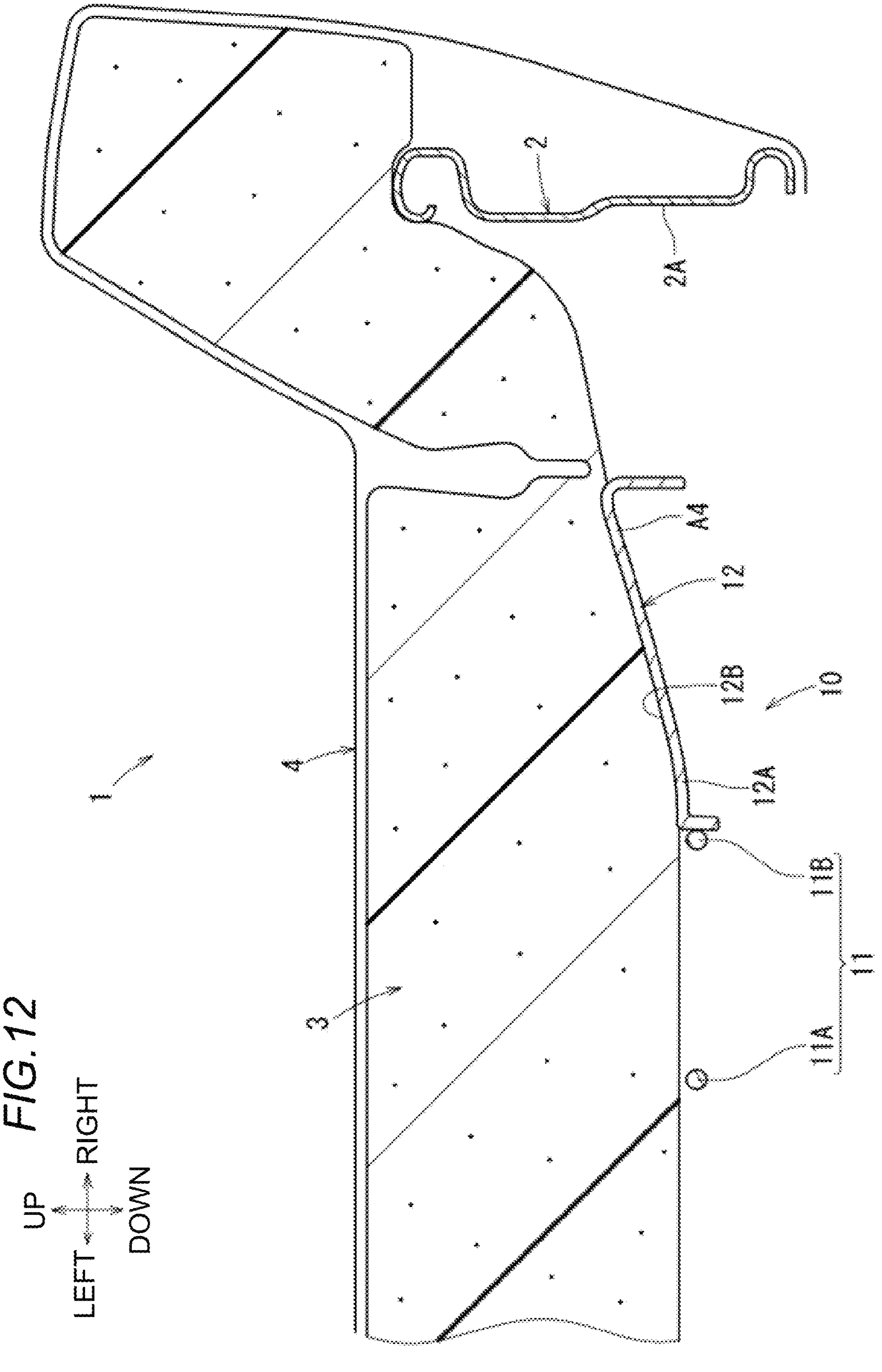
FIG. 12 is a cross-sectional view taken along a line XII-XII in FIG. 11.

As illustrated in FIG. 11, specifically, each external projecting portion A4 is formed in a region in a seat front-rear direction between the foremost crank-shaped portion B1 and the third crank-shaped portion B1 of the corresponding side wire 11B so as to project outward beyond the most external projecting portion of the corresponding side wire 11B in the seat width direction. Each external projecting portion A4 forms an upper surface flush with the pad supporting surface 12B that is an upper surface of each deflection restricting portion 12A.

Each external projecting portion A4 may project in a shape of bending obliquely upward with respect to the corresponding deflection restricting portion 12A. Further, each external projecting portion A4 may project outward in the seat width direction from the entire region of the corresponding deflection restricting portions 12A in the seat front-rear direction or in a region different from the above-described region.

By forming the external projecting portion A4 in each deflection restricting portion 12A as described above, the thighs of a seated occupant can be appropriately supported from the pad back side even when the seated occupant has a relatively large body size and the thighs are positioned relatively closer to the outer side. Each external projecting portion A4 projects from the corresponding deflection restricting portion 12A formed integrally with the corresponding side wire 11B. Accordingly, the external projecting portions A4 are less likely to sink downward and can receive a load stably. Since configurations other than the above are the same as the configurations described in the first embodiment, the same reference signs are given and the description thereof is omitted.

Other Embodiments

Although the embodiments of the present disclosure have been described above with reference to four embodiments, the present disclosure can be implemented in various embodiments other than the above embodiments.

1. The cushion spring according to the present disclosure is applicable not only to a seat cushion of a seat to be mounted on a vehicle such as an automobile or a railroad vehicle, but also to a seat cushion of a seat to be mounted on other vehicles such as an aircraft or a ship. The cushion spring is also applicable to a seat cushion of a seat not to be mounted on a vehicle.

2. In the cushion spring, the formed wires may not necessarily symmetrical to each other in the seat width direction with respect to the seat cushion frame. That is, one formed wire may have a shape different from that of the other formed wire. Further, in each formed wire, the center wire and the side wire may not necessarily be symmetrical to each other in the seat width direction. Further, in each formed wire, the center wire and the side wire may be separate wires instead of one wire.
3. In the second embodiment, the configuration in which the second crank-shaped portion from the front of each center wire is bent in the orientation of extending obliquely in the seat front-rear direction is illustrated. However, the foremost crank-shaped portion of each center wire may be bent in the orientation of extending obliquely in the seat front-rear direction. Further, both the foremost crank-shaped portion and the second crank-shaped portion from the front may be bent in the orientation of extending obliquely in the seat front-rear direction, that is, in a V shape in a plan view.
4. The inner edge of each deflection restricting portion in the seat width direction described in the first embodiment may be thinner than the outer edge as in the configuration described in the third embodiment.
5. The cushion spring may further include a bridging wire that is provided so as to integrally bridge the foremost crank-shaped portions of the center wire and the side wire of each formed wire from below. According to the above configuration, the bridging wire functions as a stabilizer, and when a load of a seated occupant is applied to one of the formed wires, the load is also transmitted to the other of the formed wires. As a result, the formed wires are less likely to sink downward and can receive the load stably.

The bridging wire may be provided so as to integrally bridge other crank-shaped portions other than the foremost crank-shaped portions of the center wire and the side wire of each formed wire from below. For example, the rear hip portion can be more appropriately supported by the rear connecting portion by integrally bridging from below, using the bridging wire, crank-shaped portions passing through the rear connecting portion of the resin member supporting the rear hip portion.

Further, the bridging wire may be provided so as to integrally bridge the rear hooking portions of the respective center wires hooked on the rear pipe. Accordingly, a distance between the rear hooking portions of the respective center wires is restricted from decreasing. As a result, when the load of the seated occupant is applied to the rear connecting portion of the resin member, a situation can be restricted in which the rear hooking portions of the respective center wires are displaced so that the distance therebetween is reduced, and the rear hip portion can be more appropriately supported by the rear connecting portion.

6. In the embodiments, the opening for exposing a part of the crank-shaped portion of each center wire is formed in the central connecting portion of the rear connecting portion. However, the rear connecting portion may be configured such that the above-described opening is not formed in the central connecting portion. Further, regardless of whether an opening is formed in the central connecting portion of the rear connecting portion, the center wire and the side wire of each formed wire may be formed such that portions thereof passing through the rear connecting portion extend straight in the seat front-rear direction without the crank-shaped portion.

Further, the center wire and the side wire of each formed wire may be formed such that portions thereof passing through the rear connecting portion are in a shape of bending in an orientation of extending obliquely in the seat front-rear direction so that both the rearmost crank-shaped portion and the second crank-shaped portion from the rear form a V shape in a plan view. By configuring each formed wire as described above, it is possible to shorten the wire length as compared with the configuration in which the portion passing through the rear connecting portion is the crank-shaped portion as in the configurations described in the embodiments. As a result, since the support rigidity for supporting the rear connecting portion is increased by the formed wires, the rear hip portion can be supported more appropriately.

What is claimed is:

1. A cushion spring configured to receive a load of a seated occupant by a surface of the cushion spring, the cushion spring comprising:

a pair of formed wires configured to be bridged to a seat cushion frame in a seat front-rear direction and are arranged side by side in a seat width direction; and a resin member that is joined to the pair of formed wires, wherein the pair of formed wires each have a center wire and a side wire that are arranged side by side in the seat width direction and extending in the seat front-rear direction, the center wire and the side wire are arranged in an order from a center of the seat cushion frame to an outer side in the seat width direction, and the resin member includes a rear connecting portion and a pair of deflection restricting portions, the rear connecting portion extending to connect between the side wire and the center wire and between the center wires in the seat width direction in a region on a seat rear side of an ischium supporting portion of the pair of formed wires that supports an ischium of the seated occupant via a seat cushion pad, the pair of deflection restricting portions extending from the rear connecting portion in the seat front-rear direction with an opening forming therebetween in the seat width direction, to connect all crank-shaped portions that are formed in the side wires and bent to repeatedly folding in the seat width direction.

2. The cushion spring according to claim 1, wherein the pair of deflection restricting portions planarly support the seat cushion pad from a pad back side, in which a pad supporting surface of each of the deflection restricting portions is angled obliquely inward and is at a position higher than the side wire connected by the pair of deflection restricting portions.

3. The cushion spring according to claim 1, wherein the pair of deflection restricting portions connect all the crank-shaped portions formed in each side wire in the seat front-rear direction over an entire region in the seat width direction.

4. The cushion spring according to claim 1, wherein the pair of deflection restricting portions include an external projecting portion that projects outward beyond a most external projecting portion of each side wire in the seat width direction and planarly support the seat cushion pad from a pad back side.

5. The cushion spring according to claim 1, wherein
an inner edge of the pair of deflection restricting portions in the seat width direction is thinner than an outer edge of the pair of deflection restricting portions.

6. The cushion spring according to claim 1, wherein
the rear connecting portion includes a recessed clamp portion that is recessed from a seat front side toward a seat back side to clamp an object from the seat back side, and a rib that projects in a recess of the clamp portion to form an upper surface flush with the rear connecting portion.

7. A cushion spring configured to receive a load of a seated occupant by a surface of the cushion spring, the cushion spring comprising:
a pair of formed wires configured to be bridged to a seat cushion frame in a seat front-rear direction and are arranged side by side in a seat width direction; and
a resin member that is joined to the pair of formed wires, wherein
the pair of formed wires each have a center wire and a side wire that are arranged side by side in the seat width direction and extending in the seat front-rear direction,
the center wire and the side wire are arranged in an order from a center of the seat cushion frame to an outer side in the seat width direction,
the resin member includes a rear connecting portion and a pair of deflection restricting portions, the rear connecting portion extending to connect between the side wire and the center wire and between the center wires in the seat width direction in a region on a seat rear side of an ischium supporting portion of the pair of formed wires that supports an ischium of the seated occupant via a seat cushion pad, the pair of deflection restricting portions extending from the rear connecting portion in the seat front-rear direction to connect all crank-shaped portions that are formed in the side wires and bent to repeatedly folding in the seat width direction,
the rear connecting portion includes a central connecting portion that connects between the center wires and between a pair of side connecting portions each of which connects the side wire and the center wire, and
the central connecting portion and the pair of side connecting portions planarly support the seat cushion pad from a pad back side at an angle facing obliquely forward, at a position higher than the center wires, and the side wires connected by the central connecting portion and the pair of side connecting portions.

* * * * *